J. H. SALE.
AUTOMATIC VEHICLE BRAKES.
No. 180,645. Patented Aug. 1, 1876.
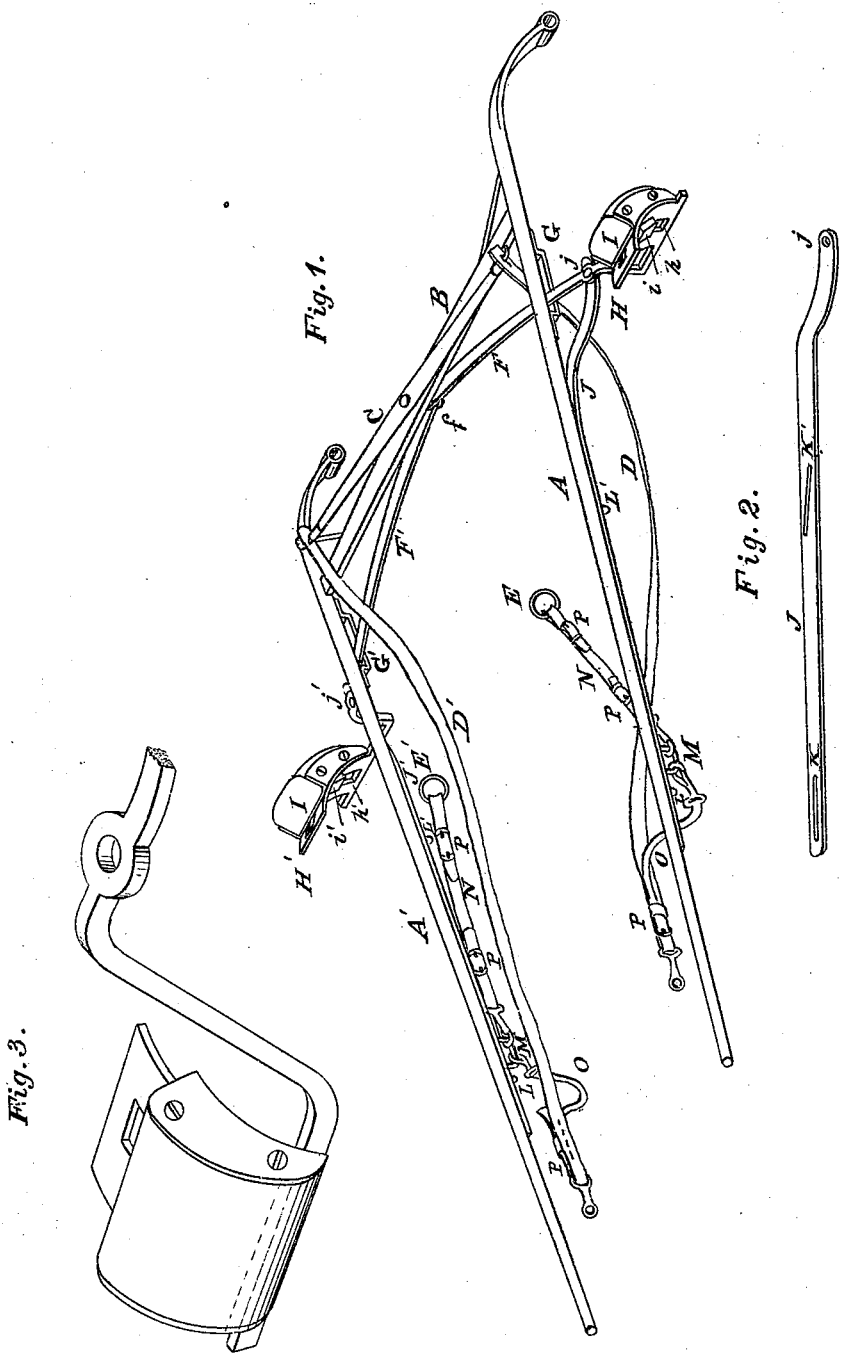

UNITED STATES PATENT OFFICE.

JAMES H. SALE, OF DILLSBOROUGH, INDIANA.

IMPROVEMENT IN AUTOMATIC VEHICLE-BRAKES.

Specification forming part of Letters Patent No. 180,645, dated August 1, 1876; application filed May 4, 1876.

*To all whom it may concern:*

Be it known that I, JAMES H. SALE, of Dillsborough, Dearborn county, Indiana, have invented a new and useful Automatic Brake for Vehicles, of which the following is a specification:

My brake is devised to operate automatically in conjunction with the wheels of a two-wheel, or with the front wheels of a four-wheel, vehicle.

In the accompanying drawings, Fig. 1 is a perspective view of a pair of buggy-shafts, provided with my improved brake. Fig. 2 represents one of my pair of sliding bars, detached. Fig. 3 represents, on a larger scale, one of my rubbers, viewed from the rear side.

A A' may represent a pair of any customary shafts or thills; B, the cross-tree; C, the single-tree; D D', the traces; E E', the breeching-rings, all of customary or any desired form. Hinged to the cross-tree at $f$ are two arms, F F', whose outer ends are supported in staples G G' attached to the under side of the thills. The arms F F' have curved extremities H H', having slots $h\ h'$ for the traverse of pins $i\ i'$ that project from the blocks or rubbers I I'. Pivoted to the arms F F' at $j\ j'$ are bars J J', having slots K K' to receive pins L L', which project from the under side of the thills. Of these slots the forward one is longitudinal, and the rear one slightly oblique, so as to enable the bar to assume a fore-and-aft and slightly gyrating motion when impelled forward or backward, as hereinafter explained.

Each bar has an eye, M, for the engagement of the ordinary holdback-strap N, and of a strap or tug, O, that extends from the brace. Buckles P are provided, at discretion of the harness-maker.

The operation of my improved brake is as follows: So long as the traces are on full stretch no brake-action takes place; but, should the vehicle gain upon the horse, even so little as two inches, the breeching-straps instantly operate to retract the bars J J', and by so doing to press the rubbers I I' against the wheels, and this checks the advance of the vehicle. The instant that the team gains on the carriage the trace-straps O draw upon the bars J J, and thus release the brakes. Should it be desired to "back" the vehicle, the rubbers I I' merely slide upward upon the curved plates H H', and produce no action.

This improvement is applicable to either one or two horse vehicles, and whether possessing two or four wheels.

When used with two horses, a similar arrangement of bars is secured upon the under side of the tongue, straps from the neck-yoke taking the place of those from the breeching-straps, and from the double-tree those from the traces.

I claim—

The combination of the slide-bars J J', connected to the shafts or tongue by slots K K' and pins L L', the centrally-hinged levers F F', the rubbers I I', arranged to slide on the curved plates H H' of levers F F', and the tugs O O, and holdbacks N N, to impart a positive motion to the brakes by the movement of the team in either direction, as set forth.

In testimony of which invention I hereunto set my hand.

JAMES H. SALE.

Attest:
GEO. H. KNIGHT,
F. H. SALE.